United States Patent

Staver et al.

[11] Patent Number: 6,002,706
[45] Date of Patent: Dec. 14, 1999

[54] METHOD AND APPARATUS FOR CONTROLLING THE SIZE OF A LASER BEAM

[75] Inventors: Phillip Randall Staver, Hagaman; Farzin Homayoun Azad, Clifton Park; Josef Robert Unternahrer, Niskayuna, all of N.Y.

[73] Assignee: General Electric Company, Schenectady, N.Y.

[21] Appl. No.: 09/001,231

[22] Filed: Dec. 30, 1997

[51] Int. Cl.[6] .................................................. H01S 3/08
[52] U.S. Cl. ........................................ 372/108; 359/698
[58] Field of Search .................................. 372/101, 108; 359/696, 697, 698

[56] References Cited

U.S. PATENT DOCUMENTS 5,091,626  2/1992  Lewis et al. ....................... 219/121.69
5,127,019  6/1992  Epstein et al. .

OTHER PUBLICATIONS

Eustace L. Dereniak and Devon G. Crowe, *Optical Radiation Detectors*, 140–143, 148–149 (1984), no month.
Warren J. Smith, *Modern Optical Engineering*, 360–363 (1990), No month.

Primary Examiner—Rodney Bovernick
Assistant Examiner—Robert E. Wise
Attorney, Agent, or Firm—Tyler Maddry; Noreen C. Johnson

[57] ABSTRACT

A method of controlling the size of a laser beam comprises the steps of generating the laser beam with a laser, focusing the laser beam, directing the laser beam to a target, directing a portion of the laser beam to an optical detector which generates a signal representative of a fluence distribution of the laser beam, and adjusting a focal point of the laser beam based on the measured fluence distribution to control the size of the laser beam on the target. The method can be carried out with an apparatus which comprises a beam splitter which divides the laser beam into a first portion and a second portion, a lens which focuses the first portion of the laser beam for incidence on a target, a detector which receives the second portion of the laser beam and which generates a signal representative of a spatial energy distribution of the laser beam, a digitizer which digitizes the signal from the detector, a data analyzer which receives the digitized signal from the digitizer and which calculates a fluence distribution of the laser beam, and a lens controller for adjusting a position of the lens with respect to the target based on the fluence distribution.

28 Claims, 8 Drawing Sheets

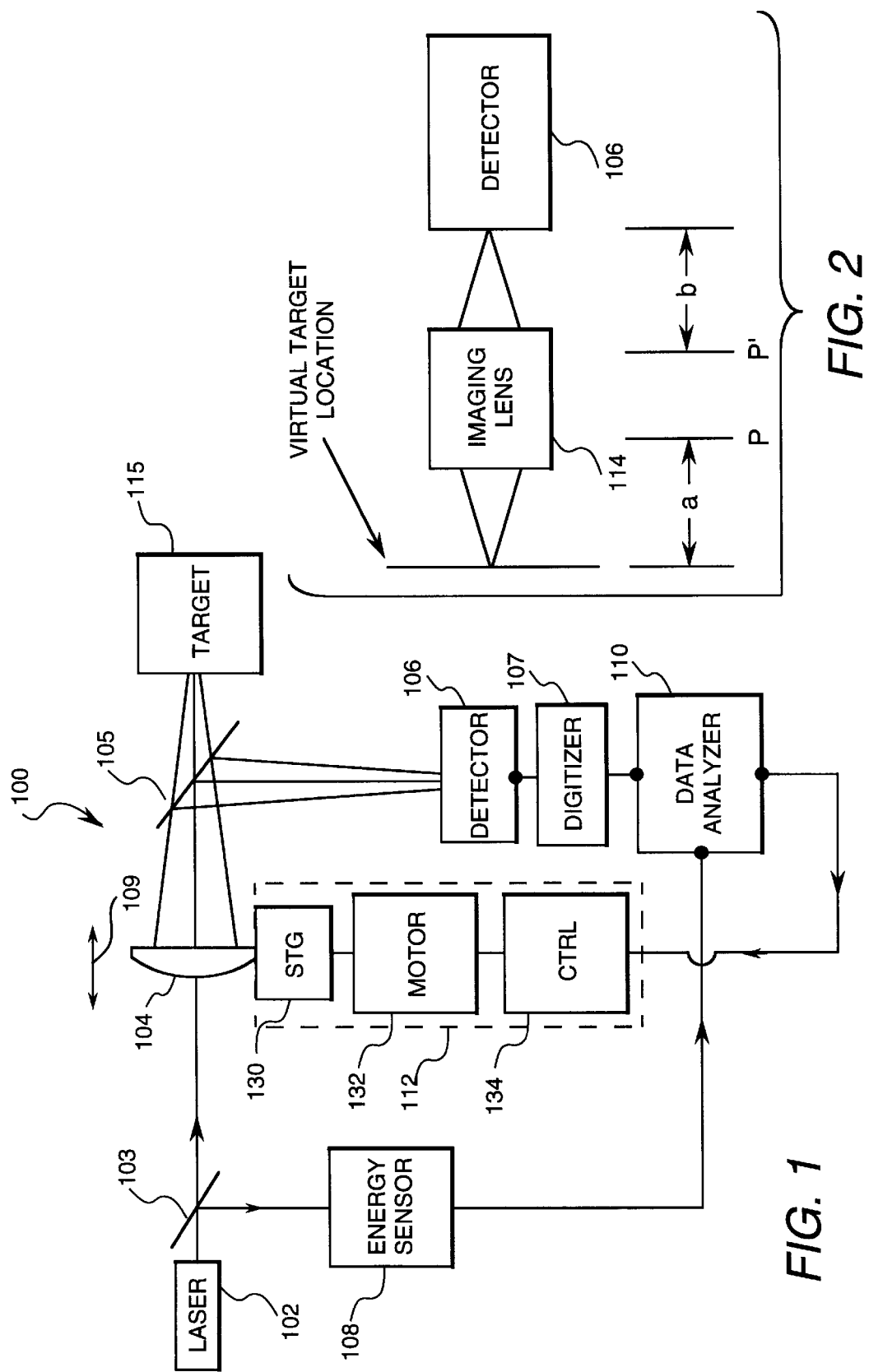

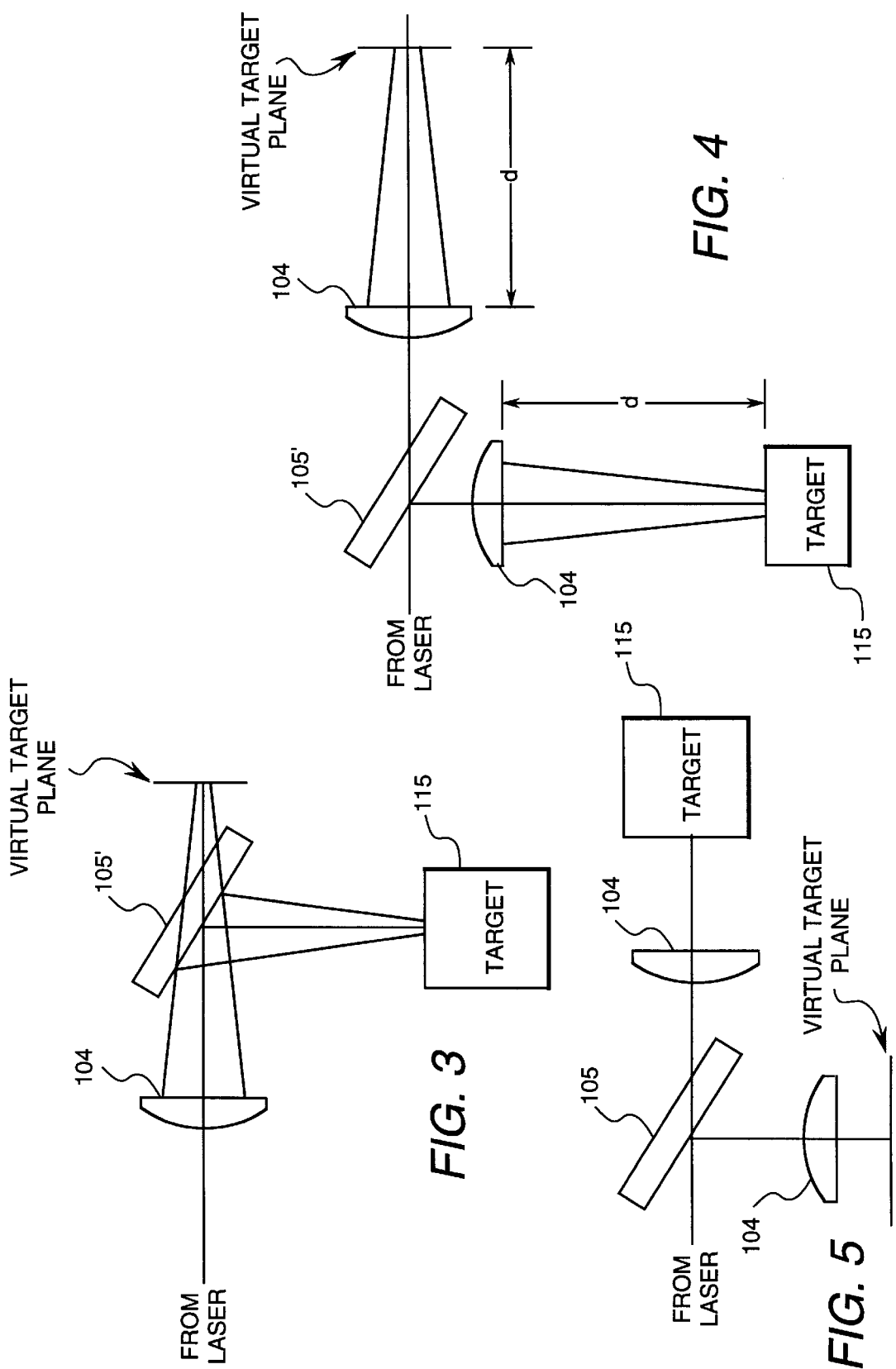

METHOD AND APPARATUS FOR CONTROLLING THE SIZE OF A LASER BEAM

FIELD OF THE INVENTION

The present invention relates generally to the control of laser beam parameters, and more particularly to a method and apparatus for controlling the size of a laser beam incident on a target.

DESCRIPTION OF THE RELATED ART

In many industrial applications using lasers, it is important to carefully control the parameters of the laser beam to achieve a desired physical effect. One example is laser shock peening, which is a process used to improve the surface characteristics of materials such as metals by the formation of a surface layer in the material which is in a state of compressive residual stress. In the laser shock peening process, a pulsed laser beam is typically focused through a transparent inertial confinement layer such as water, onto a part coated with an absorbing, ablative material such as paint, to generate a shock wave that plastically stretches the surface region of the part. The plastic deformation in the surface of the part produces a state of residual compressive stress in the part surface, which makes the part much more resistant to fatigue failure than an untreated part, because surface flaws are pressed together and their growth into cracks is inhibited. Laser shock peening is particularly useful, for example, in treating compressor fan blades in jet aircraft engines which comprise high temperature superalloys.

In laser shock peening, the mechanical stress generated by the laser pulse is typically very sensitive to the characteristics of the laser pulse. For example, the rise time of the laser pulse can have a significant effect on the resulting compressive stress generated in the part. Another important control parameter of the laser shock peening process is the fluence of the laser beam, defined as the energy per unit area measured at the part. The fluence also can have a significant impact on the compressive stress generated in the part, and may vary considerably across the cross section of the laser beam. Thus, it can be very beneficial to monitor and control the fluence distribution of the laser beam.

In order to maintain the fluence within specified tolerances, it is desirable to accurately measure the area of the laser beam at the target. According to one known method, the area of the laser beam is quantified by measuring the diameter of a mechanical indentation produced by the laser shock peening process on a metal sample, commonly known as a coupon. However, this method fails to account for the laser energy that falls outside the indentation, and thus typically underestimates the area of the laser beam and overestimates the fluence of the laser beam, which introduces a significant error into the control of the laser shock peening process. This method also provides no information about the variation of the fluence over the cross section of the laser beam.

Another known method utilizes a piece of film known as a burn paper to estimate the area of the laser beam based on the observable color change of the film. This method, however, provides only a very coarse, qualitative indication of the variation in fluence over the cross section of the laser beam.

Both of the above methods also require that an operator physically inspect the samples and manually update the system operating parameters based on the physical inspection, which is a labor intensive process. In addition, the above methods cannot be used during actual processing, since the beam must be incident on the coupon or burn paper, rather than on the target.

It would be desirable, therefore, to have an apparatus and method capable of accurately monitoring and controlling the area and fluence distribution of a laser beam, which can be used during actual processing, to improve industrial processes such as laser shock peening.

SUMMARY

A method of controlling the size of a laser beam, according to an exemplary embodiment of the invention, comprises the steps of generating the laser beam with a laser, focusing the laser beam, directing the laser beam to a target, directing a portion of the laser beam to an optical detector which generates a signal representative of a fluence distribution of the laser beam, and adjusting a focal point of the laser beam based on the measured fluence distribution to control the size of the laser beam on the target.

The method can be carried out with an apparatus which comprises a beam splitter which divides the laser beam into a first portion and a second portion, a lens which focuses the first portion of the laser beam for incidence on a target, a detector which receives the second portion of the laser beam and which generates a signal representative of a spatial energy distribution of the laser beam, a digitizer which digitizes the signal from the detector, a data analyzer which receives the digitized signal from the digitizer and which calculates a fluence distribution of the laser beam, and a lens controller for adjusting a position of the lens with respect to the target based on the fluence distribution.

The method and apparatus can be used to improve industrial processes such as laser shock peening by monitoring and controlling the fluence of the laser beam.

BRIEF DESCRIPTION OF THE DRAWINGS

Other features and advantages of the invention will be more readily understood upon reading the following detailed description in conjunction with the drawings in which:

FIG. 1 is a drawing of an apparatus for controlling the size of a laser beam according to an exemplary embodiment of the invention;

FIG. 2 is a drawing of an imaging device for imaging the leakage beam onto the detector of FIG. 1;

FIGS. 3–5 illustrate further embodiments of the lens and beam splitter of FIG. 1;

DETAILED DESCRIPTION OF THE PREFERRED EMBODIMENTS

Figure 6:
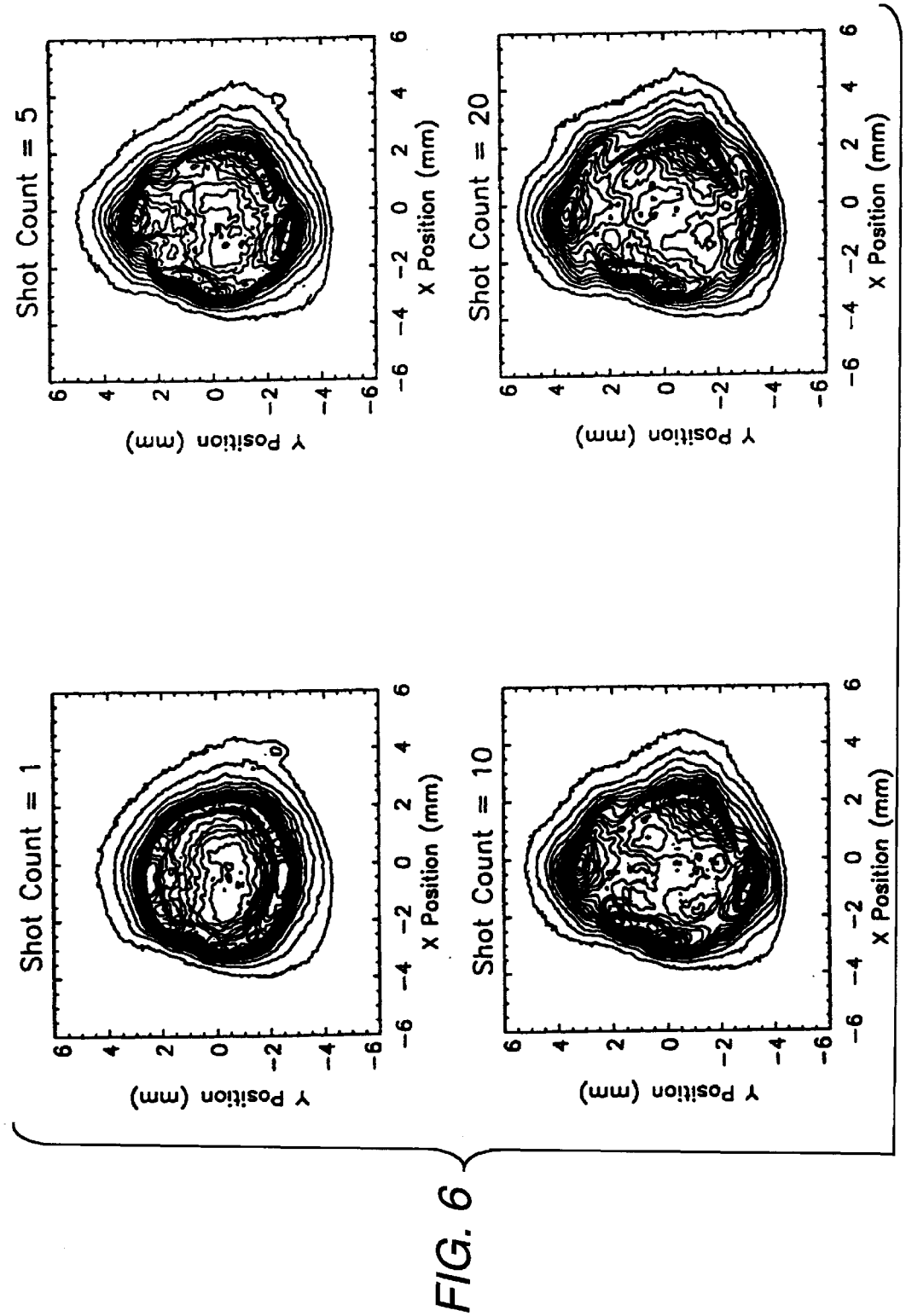
FIGS. 6–8 illustrate examples of fluence distributions of the laser beam.

FIG. 1 illustrates an apparatus for controlling laser beam parameters such as size and fluence. The apparatus 100 includes a laser 102, a lens 104, a detector 106 which may comprise an array of optical elements, a digitizer 107, an energy sensor 108, a data analyzer 110, and a lens controller 112. The laser 102 generates a laser beam, typically having a wavelength of 1.054 microns, and may comprise a Nd:g-lass rod pumped by xenon or krypton flashlamps, a Q-switch such as a Pockels cell, and a laser cavity defined by a first nearly 100% reflective mirror and a second mirror of 70–80% reflectivity, for example.

In laser shock peening, the target is typically hit from opposite sides simultaneously. This may be accomplished by initially splitting the beam into two substantially equal beams. For clarity, the drawings and following description illustrate only one of the two beams, which are typically processed in the same manner.

The laser beam is incident on a first beam splitter 103, which typically comprises an optical wedge. The beam splitter 103 redirects a known fraction of the total beam energy to an energy sensor 108, which may be a pyroelectric energy sensor, as described in commonly-owned U.S. application Ser. No. 08/961,692, filed Oct. 31, 1997, by Unternahrer et al., entitled "Method and Apparatus for Measuring Laser Pulse Energy", which is hereby incorporated by reference. The energy sensor 108 provides an accurate measurement of the total beam energy, which can be used to calibrate or scale the relative spatial energy distribution of the laser beam measured with the detector 106.

The laser beam is then incident on a lens 104 which focuses the laser beam to a desired area at the target 115, which may be, for example, a compressor fan blade of an aircraft engine. After the focusing lens 104, a second beam splitter 105, which may comprise an optical wedge or an anti-reflection coated optical window for example, redirects a portion (typically <1 percent) of the beam energy to the detector 106. The detector 106 may comprise a charge coupled device (CCD) camera, such as that manufactured by Cohu Electronics, model number 4800, which includes an array of optical elements. The detector 106 is preferably located so that the optical path length from the lens 104 or beam splitter to the detector 106 is substantially equal to the optical path length from the lens 104 or beam splitter to the target 115. The plane at which the path lengths are equal may be referred to as the virtual target plane. At the virtual target plane, the laser beam leaked with the beam splitter 105 has substantially the same spatial intensity characteristics as the beam incident upon the target 115.

In order to avoid polarization dependent effects, the beam splitters 103, 105 depicted in FIG. 1 preferably have reflectivities that are nearly equal for both incident polarizations. The beam splitters can also be arranged so that they are nearly perpendicular (e.g. between 80° and 100°) to the incident beam to avoid polarization dependent effects. The laser 102 can also be adapted to generate a circularly polarized beam using various conventional optical elements so that any polarization dependent effects are averaged over many polarization cycles.

As shown in FIG. 2 in order to utilize a desired area of the detector 106, a lens 114, either single or multi-element, or a mirror, can be provided to alter the area of the laser beam. The lens 114 is provided between the virtual target plane and the detector 106 to image the beam onto the detector 106 so that the beam area at the detector 106 covers a desired proportion of the detector 106. For example, if the detector 106 comprises a 240×240 pixel array of optical elements, the beam can be imaged onto a circle at the center of the array having a diameter of between about 150 and 200 pixels. The diameter of the beam may be defined by the diameter which contains 99% of the beam energy, for example. If the lens 114 is used, the fluence distribution determined by the detector 106 is scaled appropriately according to the degree of magnification or demagnification. Magnifications greater or less than 1.0 are achievable by adjusting the relative positions of the virtual target plane, the lens 114, and the detector 106, as defined by the variables a and b in FIG. 2. In FIG. 2, P refers to the lens front principle plane, while P' refers to the lens rear principle plane.

FIGS. 3, 4, and 5 illustrate other embodiments of the apparatus. In FIG. 3, the weakly reflecting beam splitter 105 of FIG. 1 is replaced with a highly reflective mirror 105', and the locations of the virtual target plane and real target 115 are reversed. The highly reflective mirror 105' may have a reflectivity of greater than 99%, for example. In FIG. 4, a highly reflective mirror 105' is placed in front of the focusing lens 104, and a second focusing lens 104 is placed in the leakage beam in the optical path to the virtual target plane. FIG. 5 illustrates an embodiment in which the beam splitter 105 comprises an optical wedge or an antireflection coated optical window, for example. In FIG. 5, a first lens 104 is placed between the beam splitter 105 and the target 115, and a second lens 104 is placed between the beam splitter 105 and the virtual target plane. The lenses 104 in FIGS. 1, 3, 4, and 5 may also be replaced by concave mirrors tilted at some non-zero tilt angle, according to further embodiments of the invention. The devices in each of FIGS. 3, 4, and 5 are preferably configured to have a virtual target plane at which the leakage beam has substantially the same spatial intensity characteristics as the beam incident on the target 115.

Referring back to FIG. 1, when the laser beam has been suitably directed onto the detector 106, the detector 106 converts the incident optical energy of each pixel into respective voltage signals representative of the relative energy of each pixel in the detector array over a fixed time period. Typically, the fixed time period is considerably longer than the duration of the laser pulse. Hence, the voltage signal output by the detector 106 represents the energy received by each pixel for the entire pulse duration. The voltage signal, according to one embodiment is in the form of a conventional video signal.

The video signal is received by the digitizer 107, which may comprise a frame grabber such as the Coherent Lasers BeamView Analyzer PC, which digitizes and stores the video signal frame by frame. The digitized data is then transmitted to the data analyzer 110 which may comprise a personal computer, for example. With the data from the detector 106, which represents the spatial energy distribution of the beam, and the data from the energy sensor 108, which represents the total beam energy, the data analyzer 110 is equipped to perform various analyses relating to the fluence distribution of the laser beam, which will now be described.

Figure 7:
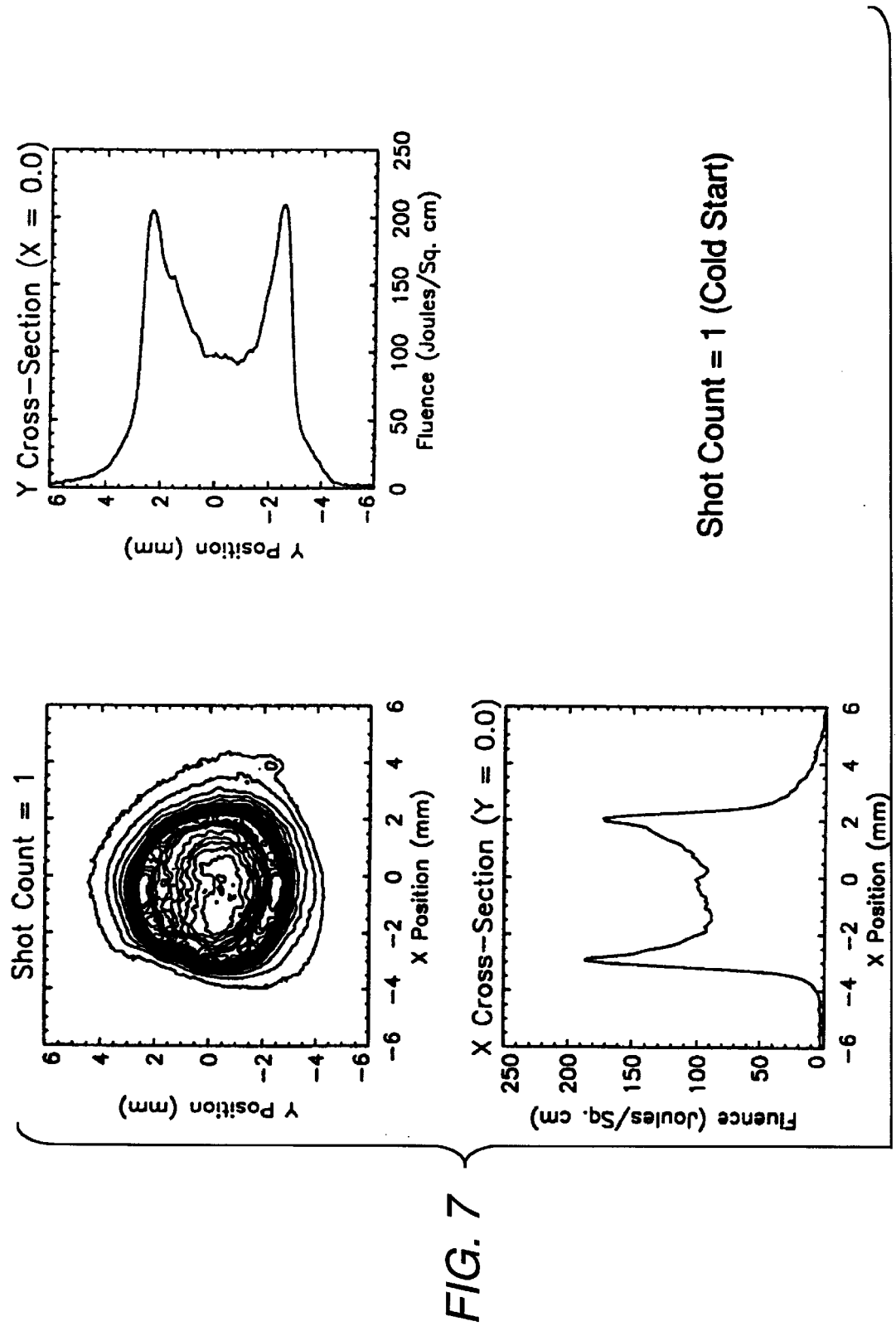
Figure 8:
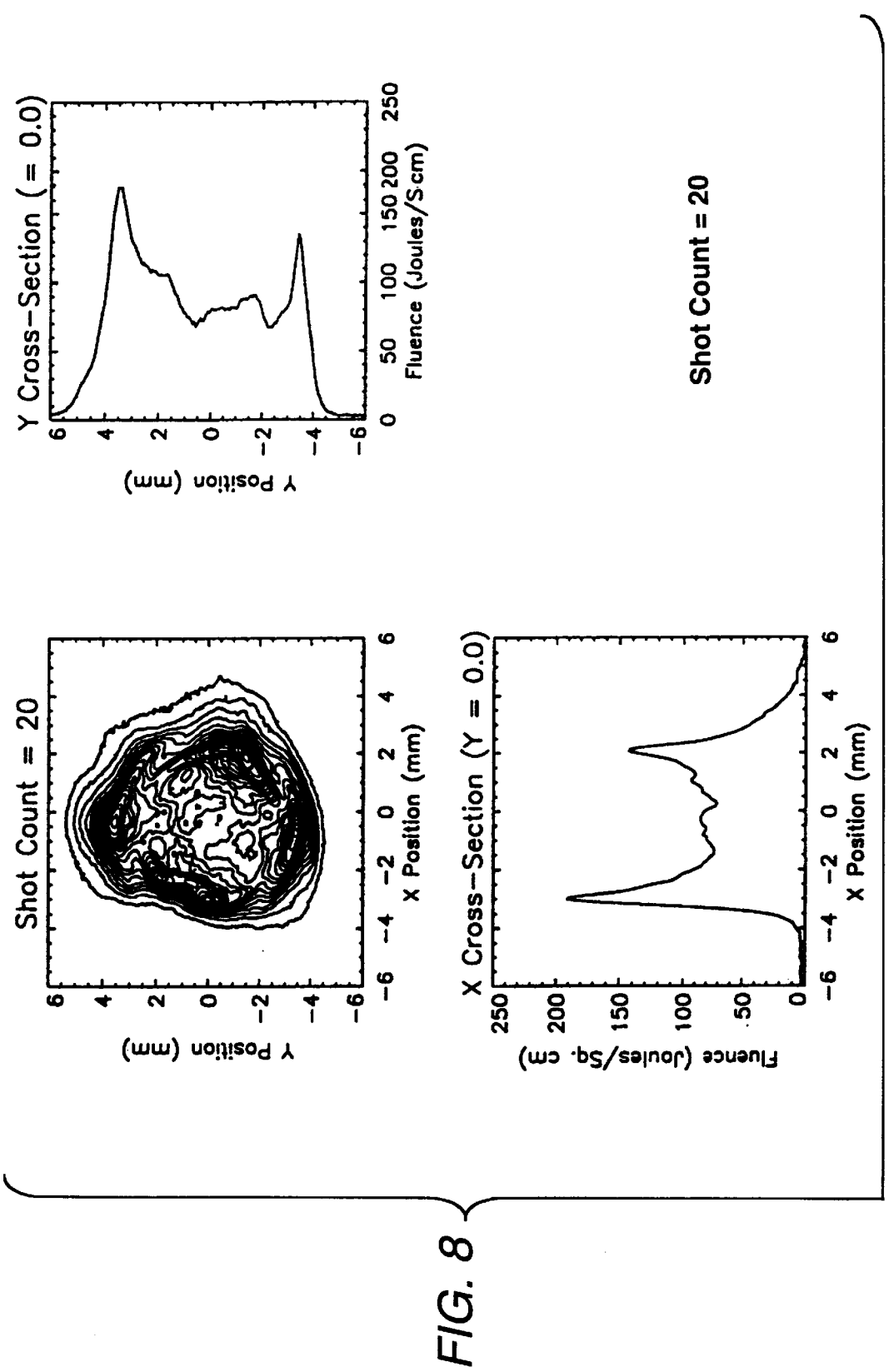

According to one embodiment, the data analyzer 110 initially calculates the fluence distribution $\Phi_{i,j}$ (Joules/cm$^2$) of the laser beam. The fluence distribution can be determined from the digitized signal which represents the voltages $V_{i,j}$ of each pixel (defined by i and j) as follows:

$$\Phi_{i,j} = V_{i,j} \cdot \frac{E_p}{\Delta x \cdot \Delta y \cdot \sum_{i,j} V_{i,j}} \quad (1)$$

where $E_p$ is the pulse energy as determined using the energy sensor 108 depicted in FIG. 1, and the parameters $\Delta x$ and $\Delta y$ represent the dimensions of the optical elements (pixels) of the detector 106. Δx and Δy are scaled appropriately if imaged by the imaging lens 114 (FIG. 2) onto the detector 106 from the virtual target plane. Examples of fluence contour plots of $\Phi_{i,j}$ for different numbers of pulses (shot count) are illustrated in FIGS. 6, 7, and 8.

Figure 9:
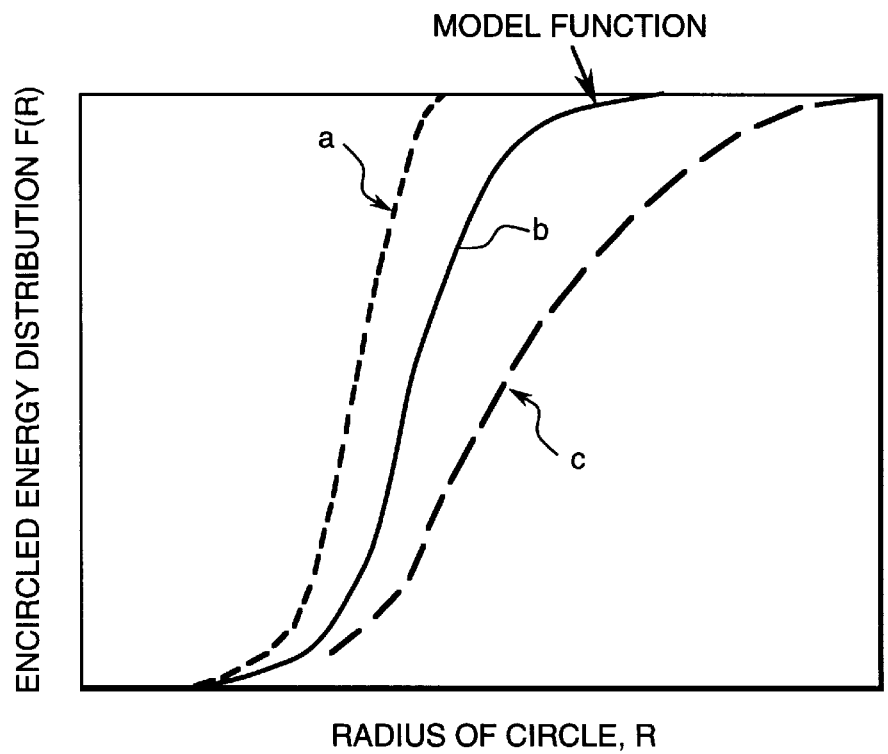
FIG. 9 illustrates an example of an encircled energy distribution function.

The fluence distribution as defined in equation (1) can be used to calculate a number of other functions (defined in equations (2)–(4) below, e.g.) which are useful for selecting a laser beam area incident on the target which is suitable for laser shock peening. For example, a function called the encircled energy distribution, F(R), which qualitatively represents the percentage of total energy encircled within a radius R, can be defined as:

$$F(R) = \frac{\int_0^{2\pi}\int_0^R \Phi(r,\theta)r\,dr\,d\theta}{\int_0^{2\pi}\int_0^{\infty}\Phi(r,\theta)r\,dr\,d\theta} \quad (2)$$

where r and R are measured from the energy centroid of the beam and r and θ are polar coordinates. An example of the encircled energy distribution function is shown in FIG. 9.

To determine a suitable laser beam area, the actual encircled energy distribution function calculated by the data analyzer 110 with data from the detector 106 can be compared with a model encircled energy distribution function. The model encircled energy distribution function typically represents an encircled energy distribution function of a laser beam which has produced satisfactory laser shock peening results in past operations. The actual and model encircled energy distribution functions can be displayed graphically on a screen of the data analyzer 110, as shown in FIG. 9.

An actual encircled energy distribution function (curve "c" in FIG. 9) which falls to the right of the model function (curve "b") indicates that an insufficient amount of energy is encircled within a particular radius R. Hence, the area of the laser beam incident on the target is too large and should be focused to a smaller area. Conversely, an actual encircled energy distribution function (curve "a" in FIG. 9) which falls to the left of the model function (curve "b"), indicates that a greater amount of the beam energy than desired is within a particular radius at the target. Thus, the total area of the laser beam incident on the target is smaller than desired and should be increased.

Increasing or decreasing the area of the laser beam incident on the target 115 can be accomplished automatically by the data analyzer 110. According to one embodiment, the data analyzer refers to a look-up table stored in the data analyzer 110 which relates the difference between the actual and model encircled energy distribution functions to a degree of change in the position of the lens 104. The difference between the actual and model encircled energy distribution functions can be quantified as the area between the two curves (e.g. curves "b" and "c" in FIG. 9). Thus the look-up table includes a list of areas, which may be positive or negative, which are correlated with a change in the position of the lens 104. To determine the change in position of the lens 104, the data analyzer 110 calculates the area between the actual and model encircled energy distribution function curves and finds the corresponding lens position change in the look-up table. The data analyzer 110 then sends a signal representative of the change in position of the lens 104 to the lens controller 112 to adjust the position of the lens 104 with respect to the target 115. The look-up table data can be determined empirically prior to peening operations and stored in the data analyzer 110.

The lens controller 112 includes suitable conventional hardware, software, and electronics to move the lens 104 along the translation direction 109 to enlarge or reduce the area of the laser beam at the target 115. For example, as shown in FIG. 1, the movement may be affected by a conventional stepper motor 132 such as that manufactured by Compumotor, model ZETA57-83, which moves a stage 130, such as manufactured by Parker Hannifin Corp., Daedal Division, to which the lens 104 is fixed. The stepper motor 132 can be controlled by a controller 134 such as that manufactured by Compumotor, model no. AT6400. The controller 134 includes a processor which converts commands received from the data analyzer 110 into command signals for the stepper motor. The lens controller 112 thus moves the lens 104 along the axis 109 in response to commands received from the data analyzer 110. The lens controller 112 may also include two additional stepper motors and stages to move the lens 104 in 3 dimensions for correction of spatial drift of the laser beam, as will be described below. The lens controller 112 may also include suitable mechanical controls, e.g. knobs, to allow an operator to manually adjust the position of the lens 104 in three dimensions.

Increasing or decreasing the total area of the laser beam can also be accomplished manually by an operator who views the actual and model encircled energy distribution functions on the screen of the data analyzer 110. The operator manually adjusts the position of the lens 104 and its focal point with respect to the target 115 with the mechanical controls of the lens controller 112 while visually monitoring the actual and model encircled energy distribution functions to cause the two functions to overlap within a specified tolerance.

According to other embodiments of the invention, the lens 104 comprises a zoom lens which can be automatically or manually focused with a suitably configured lens controller.

Figure 10:
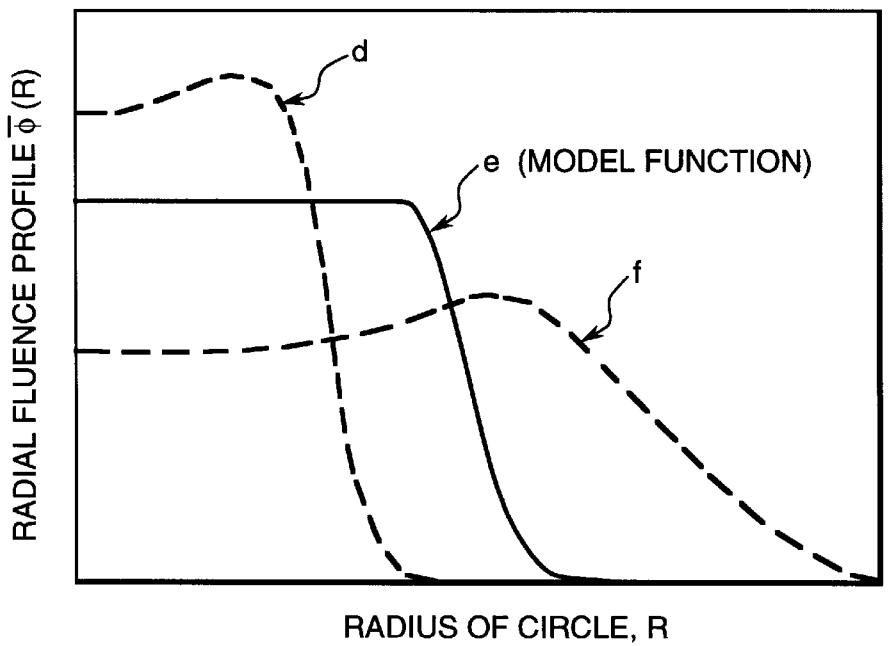
FIG. 10 illustrates an example of a radial fluence profile.
Figure 11:
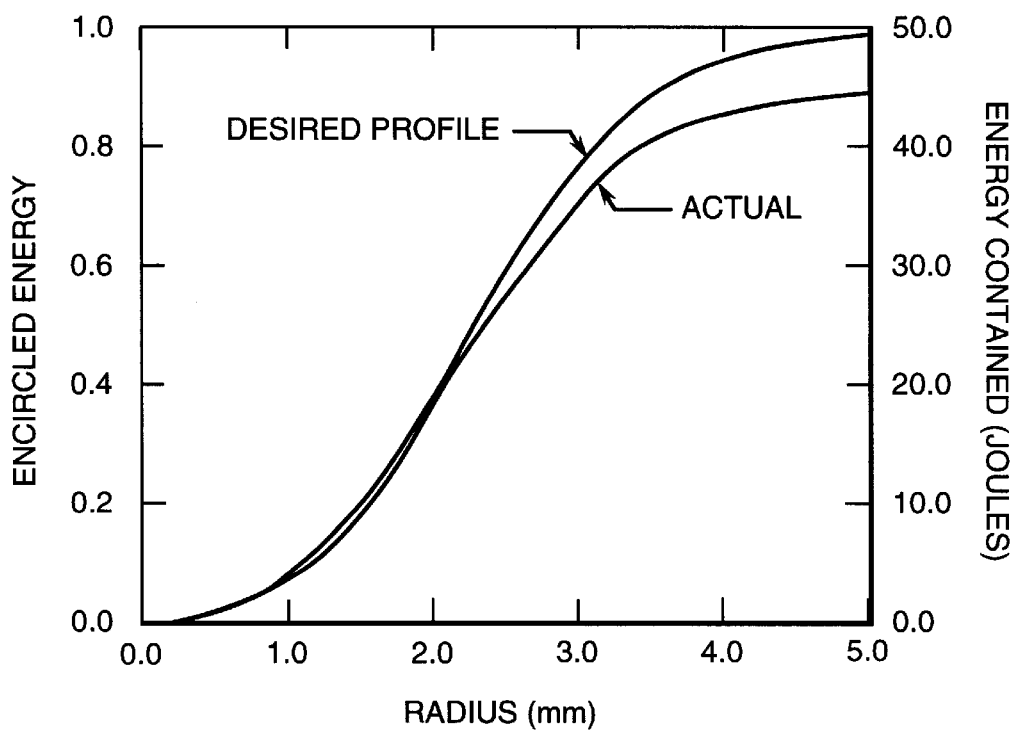
FIG. 11 illustrates another example of an encircled energy distribution function.
Figure 12:
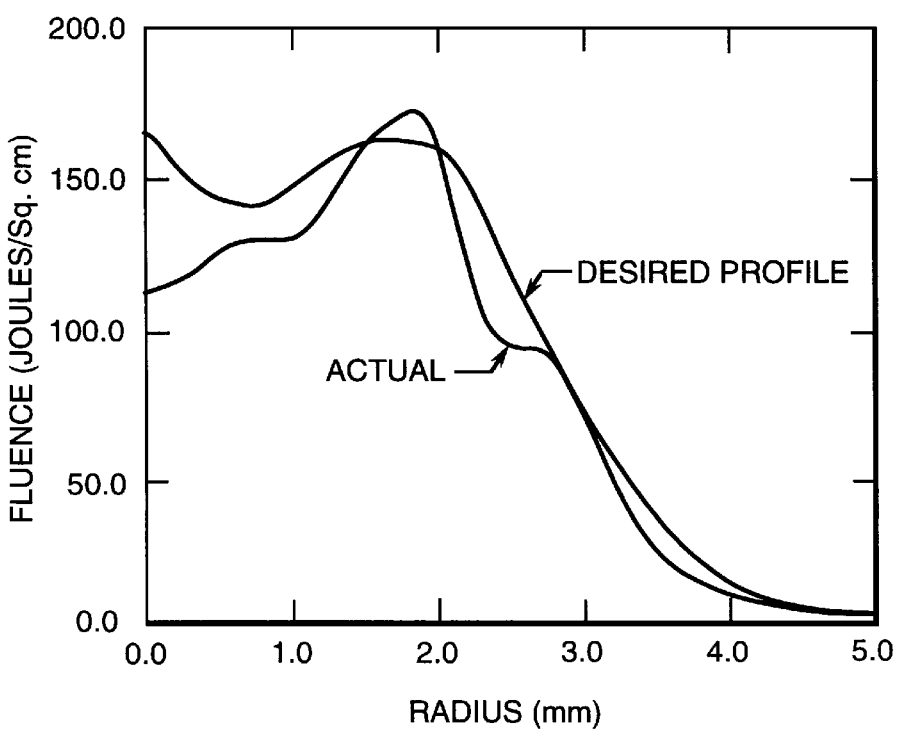
FIG. 12 illustrates another example of a fluence distribution.
Figure 13:
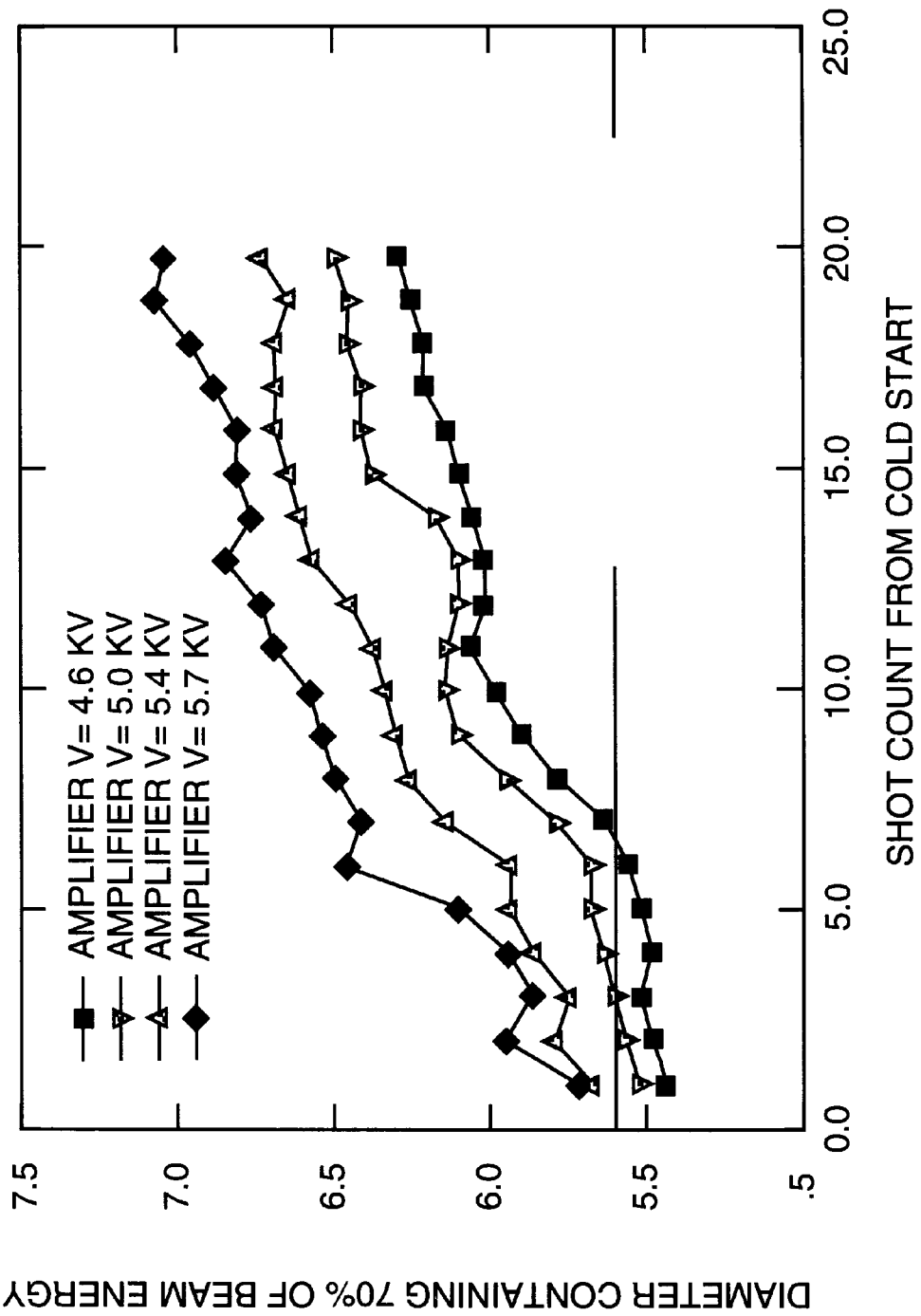
FIG. 13 illustrates a scalar which represents a circle diameter which contains 70% of the beam energy.

To facilitate manufacturing operations, the laser beam size can be quantified with a scalar variable rather than with a curve such as shown in FIGS. 9 and 10, according to another embodiment of the invention. According to one example, an encircled energy scalar $R_{ee}$ is derived from the encircled energy distribution function F(R), which scalar represents the radius which contains a certain fraction, e.g. 70%, of the total beam energy. The encircled energy scalar is shown in FIG. 13 for five different amplifier voltages. The data from which the encircled energy scalar is derived are shown in FIGS. 11 and 12. The encircled energy scalar $R_{ee}$ can be calculated automatically by the data analyzer 110 from the encircled energy distribution function F(R).

After the actual encircled energy scalar, e.g. the value of the radius which contains 70% of the total beam energy, has been calculated, it is compared to a model encircled energy scalar, and the position of the lens 104 and its focal point with respect to the target 115 can be adjusted automatically by the data analyzer 110 to cause the actual encircled energy scalar to equal the model encircled energy scalar to within a predetermined tolerance. The data analyzer 110 can determine the degree of change in position of the lens 104 with a look-up table which relates the difference between the actual encircled energy scalar and the model encircled energy scalar to the amount of change of the position of the lens. The encircled energy scalar look-up table can be determined empirically prior to peening operations and stored in the data analyzer 110.

The position of the lens 104 can also be adjusted manually by an operator. For example, the data analyzer 110 can be programmed to display the actual and model encircled energy scalars, which allows the operator to make manual adjustments to the lens position to reduce the difference between the actual and model encircled energy scalars.

FIG. 10 illustrates a second function, the radial fluence profile, which can be used to quantify and adjust the area and fluence of the laser beam incident on the target 115. The radial fluence profile $\overline{\Phi}(R)$ is derived from the fluence distribution of equation (1) and the encircled energy distribution of equation (2), and is defined as:

$$\overline{\Phi}(R) = \frac{E_p}{2\pi R} \cdot \frac{d F(R)}{d R} \quad (3)$$

To determine a desired position adjustment to the lens 104, the actual radial fluence profile, calculated by the data analyzer 110 with data from the detector 106, can be compared to a model radial fluence profile which has produced satisfactory laser shock peening results in past operations. The position of the lens 104 with respect to the target 115 can then be adjusted automatically by the data analyzer 110 and electronic controls of the lens controller 112 so that the actual radial fluence profile overlaps the model radial fluence profile to within a desired tolerance. As with the encircled energy distribution function described above, the data analyzer 110 can include a look-up table which relates the difference between the model and actual radial fluence profiles to a change in the position of the lens 104. The data analyzer 110 then sends a signal representative of the change in position of the lens 104 to the lens controller 112 to adjust the position of the lens 104 with respect to the target 115. The look-up table for the radial fluence profile can be determined empirically prior to peening operations and stored in the data analyzer 110.

The position of the lens 104 can also be adjusted manually by an operator with the mechanical controls on the lens controller 112 based on a visual comparison of the actual and model radial fluence profiles. As shown in FIG. 10, the data analyzer 110 can be programmed to plot the actual (e.g. curves "d" and "f") and model (curve "e") radial fluence profiles, which allows an operator to manually adjust the lens 104 to reduce the difference between the actual and model radial fluence profiles to within a desired tolerance.

As with the encircled energy distribution function, a scalar variable can be derived from the radial fluence profile $\overline{\Phi}(R)$ to facilitate processing operations. According to one example, a radial fluence scalar $R_{rf}$ is defined as the radius that corresponds to a certain fraction of the highest average radial fluence for the laser beam. The radial fluence scalar $R_{rf}$ can be obtained, for example, by determining the highest average fluence of any radius in the laser beam, multiplying the highest average fluence by the desired fraction, e.g. 50%, and finding the radius having that average fluence. The radius having that average fluence (e.g. 50% of the highest average fluence) is the radial fluence scalar for the laser beam. The radial fluence scalar is then compared to a model radial fluence scalar, and the position of the lens 104 and its focal point with respect to the target 115 is adjusted manually or automatically to cause the actual radial fluence scalar to equal the model radial fluence scalar to within a preselected tolerance. The look-up table data can be determined empirically prior to peening operations. The data analyzer 110 can determine the degree of change in position of the lens 104 with a look-up table which relates the difference between the actual and model radial fluence scalars to the amount of change of the position of the lens. The data analyzer 110 can also be programmed to display the actual and model radial fluence scalars to allow an operator to manually adjust the position of the lens 104.

According to another embodiment of the invention, a third function, the normalized radial fluence profile, is used to determine a position adjustment of the lens 104. The normalized radial fluence profile is a measure of the radial fluence profile per unit pulse energy, and is obtained by dividing the radial fluence profile $\overline{\Phi}(R)$ by the pulse energy $E_p$ as follows:

$$\text{Fluence Per Joule} = \frac{\overline{\Phi}(R)}{E_p} = \frac{1}{2\pi R} \cdot \frac{d F(R)}{d R} \quad (4)$$

One advantage of the normalized radial fluence profile is that it is a property of the spatial characteristics of the laser beam and does not depend on the pulse energy. Therefore, it can be used to quantify the spatial characteristics of the laser beam without reference to the total energy of the laser beam.

The actual normalized radial fluence profile calculated by the data analyzer 110 with data from the detector 106 can be used to automatically adjust the position of the lens 104 with an empirically derived look-up table. The data analyzer 110 then sends a signal to the lens controller 112 to move the position of the lens 104 with respect to the target 115 accordingly. The actual normalized radial fluence profile can also be compared visually by an operator to a model normalized radial fluence profile on the screen of the data analyzer 110, and the difference between the two can be reduced by manually adjusting the position of the lens 104 with respect to the target 115.

To facilitate manufacturing operations, a normalized radial fluence scalar $R_{nrf}$ can be derived from the normalized radial fluence profile. The normalized radial fluence scalar represents, for example, the radius that corresponds to a certain fraction of the highest average normalized radial fluence for the laser beam. The normalized radial fluence scalar can be used to manually or automatically adjust the position of the lens 104, as described above.

According to another aspect of the invention, the data acquired by the detector 106 is used to monitor and control spatial drifting of the laser beam on the plane of the target 115. Such spatial drifting can be caused, for example, by thermal changes in the optical amplifier, aging of pump lamps, movement of optical components of the laser, etc. The resulting movement of the laser beam on the laser shock peening target can result in some areas of the target being missed, while others receive double the peening shots.

Typically, only a portion of the total area of the detector 106 (FIG. 1) is used to detect the leakage beam. For example in a 240×240 pixel detector array, the beam may occupy a centered circle having a 150–200 pixel diameter. Because the laser beam is typically centered on the detector 106, the outer pixels of the detector 106 receive very little incident optical energy. However, if the beam drifts in space across the face of the detector 106, pixels which are normally inactive receive energy and become active. This information can be analyzed by the data analyzer 110, which sends a correction signal to the lens controller 112 to move the lens 104 such that the laser beam returns to the center of the detector 106. The lens controller 112 thus preferably includes hardware and software capable of moving the lens 104 in 3 dimensions in response to the signal sent by the data analyzer 110.

Although the invention has been described with reference to particular embodiments, those skilled in the art will recognize that modifications may be made without departing from the scope and spirit of the invention as defined in the following claims.

What is claimed is:

1. A method of controlling the size of a laser beam comprising the steps of:
   generating the laser beam with a laser;
   focusing the laser beam;
   directing the laser beam to a target;
   directing a portion of the laser beam to an optical detector which generates a signal representative of a fluence distribution of the laser beam; and
   adjusting a focal point of the laser beam based on the measured fluence distribution to control the size of the laser beam on the target.

2. The method of claim 1, wherein the step of directing a portion of the laser beam to the optical detector is carried out before the step of focusing the laser beam.

3. The method of claim 1, wherein a first optical path length to the optical detector is substantially equal to a second optical path length to the target.

4. The method of claim 1, further comprising the steps of:
   defining a virtual target plane at a first optical path length from a beam splitter which is substantially equal to a second optical path length from the beam splitter to the target; and
   imaging light from the virtual target plane onto the optical detector to utilize a desired area of the optical detector.

5. The method of claim 1, wherein the step of focusing comprises focusing the laser beam with a concave mirror.

6. The method of claim 1, wherein the step of focusing comprises focusing the laser beam with a lens.

7. The method of claim 6, wherein the step of adjusting the focal point comprises moving the lens with respect to the target such that the fluence distribution on the target changes.

8. The method of claim 6, wherein the lens comprises a zoom lens which is adjusted to move a focal point of the laser beam.

9. The method of claim 1, wherein the step of directing a portion of the laser beam is carried out with an optical element comprising at least one of a mirror, an optical window, and an optical wedge.

10. The method of claim 9, wherein the optical element has substantially equal reflectivity for any incident polarization.

11. The method of claim 9, wherein a surface of the optical element is substantially perpendicular to the incident laser beam.

12. The method of claim 1, further comprising the step of circularly polarizing the laser beam to substantially prevent polarization dependent effects produced during the directing steps.

13. The method of claim 1, further comprising the steps of:
   determining an actual encircled energy distribution of the laser beam based on the fluence distribution measured with the detector; and
   adjusting the focal point of the laser beam based on a comparison of the actual encircled energy distribution and a model encircled energy distribution.

14. The method of claim 1, further comprising the step of:
   determining an actual radial fluence profile of the laser beam based on the fluence distribution measured with the detector; and
   adjusting the focal point of the laser beam based on a comparison of the actual radial fluence profile and a model radial fluence profile.

15. The method of claim 1, further comprising the step of:
   determining an actual normalized radial fluence profile of the laser beam based on the fluence distribution measured with the detector; and
   adjusting the focal point of the laser beam based on a comparison of the actual normalized radial fluence profile and a model normalized radial fluence profile.

16. The method of claim 1, further comprising the step of:
   determining, from the measured fluence distribution, an encircled energy scalar which represents a radius of a circle which contains a predetermined percentage of the energy of the laser beam; and
   adjusting the focal point of the laser beam based on a comparison of the encircled energy scalar with a model encircled energy scalar.

17. The method of claim 1, further comprising the step of:
   determining, from the measured fluence distribution, a value of the greatest average fluence of a first radius;
   determining a radial fluence scalar which represents a second radius of a circle having a predetermined percentage of the greatest average fluence; and
   adjusting the focal point of the laser beam based on a comparison of the radial fluence scalar and a model radial fluence scalar.

18. The method of claim 1, further comprising the step of:
   determining, from the measured fluence distribution, a value of the greatest average normalized fluence of a first radius;
   determining a normalized radial fluence scalar which represents a second radius of a circle having a predetermined percentage of the greatest average normalized fluence; and
   adjusting the focal point of the laser beam based on a comparison of the normalized radial fluence scalar and a model normalized radial fluence scalar.

19. An apparatus for controlling a laser beam comprising:
   a beam splitter which divides the laser beam into a first portion and a second portion;
   a lens which focuses the first portion of the laser beam for incidence on a target;
   a detector which receives the second portion of the laser beam and which generates a signal representative of a spatial energy distribution of the laser beam;
   a digitizer which digitizes the signal from the detector;
   a data analyzer which receives the digitized signal from the digitizer and which calculates a fluence distribution of the laser beam; and
   a lens controller for adjusting a position of the lens with respect to the target based on the fluence distribution.

20. The apparatus of claim 19, wherein the lens controller comprises a motor which moves the lens in response to a command signal received from the data analyzer.

21. The apparatus of claim 19, wherein the lens controller includes manual controls for manually adjusting the position of the lens.

22. The apparatus of claim 19, wherein a first path length between the beam splitter and the target is substantially the same as a second path length between the beam splitter and the detector.

23. The apparatus of claim 19, further comprising a second lens for imaging light from a virtual target plane to the detector, wherein the virtual target plane is located at a path length from the beam splitter which is substantially the same as a path length from the beam splitter to the target.

24. The apparatus of claim 19, further comprising an energy sensor which measures an energy of a portion of the laser beam.

25. The apparatus of claim 19, wherein the beam splitter comprises at least one of an optical window, an optical wedge, and a mirror.

26. The apparatus of claim 19, wherein the lens also focuses the second portion of the laser beam.

27. The apparatus of claim 19, further comprising a second lens for focusing the second portion of the laser beam.

28. The apparatus of claim 27, wherein the lens and the second lens focus the first and second portions of the laser beam, respectively, after the beam splitter has split the beam.

* * * * *